(12) United States Patent
Enders et al.

(10) Patent No.: US 12,297,687 B2
(45) Date of Patent: May 13, 2025

(54) FLUID DAMPER INCLUDING A SWITCHING PISTON, METHOD FOR MANUFACTURING THE FLUID DAMPER, DRIVE ARRANGEMENT INCLUDING THE FLUID DAMPER

(71) Applicant: STABILUS GMBH, Koblenz (DE)

(72) Inventors: Stephan Enders, Koblenz (DE); Andreas Seus-Kapellen, Boppard-Udenhausen (DE); Christoph Lischetzki, Andernach (DE); Michael Schneider, Ochtendung (DE)

(73) Assignee: STABILUS GmbH, Koblenz (DE)

( * ) Notice: Subject to any disclaimer, the term of this patent is extended or adjusted under 35 U.S.C. 154(b) by 375 days.

(21) Appl. No.: 17/861,327

(22) Filed: Jul. 11, 2022

(65) Prior Publication Data

US 2023/0039706 A1 Feb. 9, 2023

(30) Foreign Application Priority Data

Jul. 21, 2021 (DE) .......................... 102021118893.8
Sep. 29, 2021 (DE) .......................... 102021125203.2

(51) Int. Cl.
*F16F 9/02* (2006.01)
*E05F 3/02* (2006.01)
(Continued)

(52) U.S. Cl.
CPC .............. *E05F 3/02* (2013.01); *F16F 9/0218* (2013.01); *F16F 9/3271* (2013.01);
(Continued)

(58) Field of Classification Search
CPC ...... F16F 9/0227; F16F 9/0218; F16F 9/3271; F16F 9/3485; F16F 9/5126; E05F 3/02; E05Y 2201/212
See application file for complete search history.

(56) References Cited

U.S. PATENT DOCUMENTS 3,763,970 A * 10/1973 Anderson ............... F16F 9/443
188/315
4,356,898 A * 11/1982 Guzder ................... F16F 9/348
188/315
(Continued)

FOREIGN PATENT DOCUMENTS

AT           523 688 A1    10/2021
DE       29 23 872 A1      1/1980
(Continued)

OTHER PUBLICATIONS

JP610248847A translation. (Year: 1986).*

*Primary Examiner* — Thomas J Williams
(74) *Attorney, Agent, or Firm* — Schmeiser, Olsen & Watts LLP

(57) ABSTRACT

A fluid damper is provided including a cylinder filled with a damping fluid, a piston base body shiftably guided in the cylinder along a stroke axis, and a valve disk spaced apart from a shell wall of the cylinder. The piston base body divides an inner space of the cylinder into a front space and a rear space along the stroke axis. In the piston base body, there is at least one channel connecting the front space to the rear space in a fluid-conducting manner. The valve disk is shiftably guided along the stroke axis between an opening position unblocking the at least one channel and a closing position closing the at least one channel. The valve disk has a central area extending radially outward from the stroke axis, the central area being free of apertures.

11 Claims, 3 Drawing Sheets

(51) Int. Cl.
*F16F 9/32* (2006.01)
*F16F 9/34* (2006.01)
*F16F 9/348* (2006.01)
*F16F 9/512* (2006.01)
*F16F 9/516* (2006.01)
*E05F 15/603* (2015.01)

(52) U.S. Cl.
CPC .......... *F16F 9/3485* (2013.01); *F16F 9/5126* (2013.01); *E05F 15/603* (2015.01); *E05Y 2201/212* (2013.01); *E05Y 2900/50* (2013.01); *F16F 2222/126* (2013.01); *F16F 2226/04* (2013.01); *F16F 2228/066* (2013.01); *F16F 2232/08* (2013.01); *F16F 2234/02* (2013.01)

(56) References Cited

U.S. PATENT DOCUMENTS

| | | | | |
|---|---|---|---|---|
| 5,106,065 A | * | 4/1992 | Staton | F16F 9/0209 |
| | | | | 188/269 |
| 5,404,972 A | * | 4/1995 | Popjoy | F16F 9/02 |
| | | | | 188/322.22 |
| 5,730,260 A | | 3/1998 | Thyssen | |
| 6,047,797 A | * | 4/2000 | Popjoy | F16F 9/0245 |
| | | | | 188/269 |
| 9,151,353 B2 | * | 10/2015 | Abreu | F16F 9/34 |
| 2023/0039706 A1 | * | 2/2023 | Enders | E05F 3/12 |

FOREIGN PATENT DOCUMENTS

| | | | |
|---|---|---|---|
| DE | 196 49 836 A1 | 6/1998 | |
| DE | 201 07 426 U1 | 8/2001 | |
| DE | 101 40 580 A1 | 6/2002 | |
| DE | 10 2004 014 395 A1 | 11/2004 | |
| DE | 10 2006 030 064 A1 | 1/2008 | |
| DE | 20 2006 015 153 U1 | 2/2008 | |
| DE | 10 2016 223 486 A1 | 7/2017 | |
| EP | 0 409 094 A1 | 1/1991 | |
| JP | 61024847 A * | 2/1986 | ............... F16F 9/50 |

* cited by examiner

FLUID DAMPER INCLUDING A SWITCHING PISTON, METHOD FOR MANUFACTURING THE FLUID DAMPER, DRIVE ARRANGEMENT INCLUDING THE FLUID DAMPER

CROSS-REFERENCE TO RELATED APPLICATIONS

This application claims priority to German Application No. 102021118893.8, having a filing date of Jul. 21, 2021, and German Application No. 102021125203.2, having a filing date of Sep. 29, 2021, the entire contents both of which are hereby incorporated by reference.

FIELD OF TECHNOLOGY

The following relates to a fluid damper comprising a cylinder filled with a damping fluid, a piston base body shiftably guided in the cylinder along a stroke axis, and a valve disk spaced apart from a shell wall of the cylinder. Along the stroke axis, the piston base body divides an inner space of the cylinder into a front space and a rear space. In the piston base body, there is at least one channel connecting the front space to the rear space in a fluid-conducting manner. The valve disk is shiftably guided along the stroke axis between an opening position unblocking the at least one channel and a closing position closing the at least one channel.

The following further relates to a method for manufacturing the fluid damper and a drive arrangement including the fluid damper.

BACKGROUND

In single-sided flap drives, typically, compression damping of the passive side (suspension strut) is provided for the event of failure of the driven side. Compression damping should only be activated from a defined threshold so that no detrimental permanent damping forces occur in normal operation. In automatic tailgates, this threshold is only just above the normal slide-in speed.

In an embodiment, a gas spring as an adjusting member is to add additional curbing/blocking protecting the entire system or the user from excessive exposure/speeds at high slide-in speeds (event of a crash, excessive operating speeds, etc.).

Known gas springs having a speed-dependent damping force include too many components, are not scalable to smaller diameters of the gas spring, have an imprecise switching point due to a multitude of involved components with error tolerances adding up, and exhibit an instable switching behaviour due to a multitude of involved components having a relatively large inertia and high frictional forces.

The document EP 0 409 094 A1 describes a fluid damper including a switching piston having a base body attached to a piston rod and comprising a circumferential seal. The base body forms a guide sleeve in which a circular disc-shaped valve body having ring segment-shaped apertures and a central aperture is shiftable along the stroke axis of the fluid damper against a spring member from an opening position into a closing position closing a channel through the base body.

The documents DE 101 40 580 A1, DE 196 49 836 A1, U.S. Pat. No. 5,730,260 A, and DE 10 2006 030 064 A1 also disclose fluid dampers respectively comprising a switching piston having a base body attached to a piston rod and comprising a circumferential seal. The switching piston further comprises a valve body shiftably guided on the base body along a stroke axis of the fluid damper from an opening position into a closing position closing a channel through the base body.

SUMMARY

An aspect relates to a fluid damper having the simplest possible design and a cost-effective and reliable production method for the fluid damper, the fluid damper reliably braking a slide-in speed of a piston of the fluid damper above a precisely defined switching speed.

The fluid damper comprises a cylinder filled with a damping fluid. In an embodiment, the damping fluid is a gas and/or is pressurised relative to an environment of the cylinder. In embodiments, the cylinder may be formed as a pressure pipe.

The fluid damper comprises a piston base body shiftably guided in the cylinder along a stroke axis. In embodiments, the cylinder may be formed as a hollow cylinder and/or arranged coaxially to the stroke axis.

The fluid damper comprises a valve disk spaced apart from a shell wall of the cylinder. In embodiments, the valve disk may be disk-shaped, for example, circular disk-shaped and/or oriented perpendicular to the stroke axis. In embodiments, the stroke axis may extend through a centre point of the valve disk.

Since the valve disk is spaced apart from the shell wall a switching function of the valve disk is not affected by frictional forces between the valve disk and the shell wall so that a particularly precise switching behaviour is achieved. Furthermore, the spacing allows for large throttle cross sections and low valve spring forces which bring about a precise switching point and low resistances in normal operation as well as low disturbances by oil drops in small cross sections.

In embodiments, the valve disk may be arranged in a recess of the piston base body, for example in a bore in the piston base body coaxial to the stroke axis. The arrangement in a recess prevents the valve disk from contacting the cylinder which might affect the switching behaviour of the valve disk.

Along the stroke axis, the piston base body divides an inner space of the cylinder into a front space and a rear space, at least one channel connecting the front space to the rear space in a fluid-conducting manner being disposed in the piston base body. In an embodiment, the at least one channel is the only fluid-conducting connection between the front space and the rear space. When the piston base body is shifted in the cylinder along the stroke axis the damping fluid can flow through the channel from the front space into the rear space or vice versa. Here, a flow resistance of the damping fluid in the channel determines the damping force the fluid damper counters the shift of the piston base body with. The flow resistance therefore determines which damping force the fluid damper counters a movement of components connected to each other by the fluid damper relative to each other with.

In embodiments, the fluid damper may be configured so that the piston base body moves from the rear space to the front space during a slide-in movement of the fluid damper in a slide-in direction. The front space and the rear space can be mutually exchanged.

The valve disk is shiftably guided relative to the piston base body along the stroke axis between an opening position unblocking the at least one channel and a closing position closing the at least one channel. The terms "unblock" and "close" mean that a minimum cross-sectional area of the channel for the damping fluid is substantially reduced in the closing position relative to the opening position, for example by 75% to 100%, by 85% to 100%, or by 95% to 99%.

In an embodiment, the channel is not fully closed in the closing position so that the piston base body is not blocked in the cylinder, but can be slowly moved on, for example for slowly closing a flap supported by the fluid damper.

The piston base body and the valve disk together thus form a switching piston by which the damping force of the fluid damper can be increased by shifting the valve disk from the opening position into the closing position. The switching function can for example be realised with fewer components involved than in prior art whereby the production of the switching piston is simplified. In an embodiment, the fluid damper requires reduced development effort due to a conventional system design, simple components (punched and/or turned parts) and few components, for example five components of the switching piston instead of six in a known switching piston.

In embodiments, the valve disk may be shifted from the opening position into the closing position when a positive pressure in the front space relative to the rear space exceeds a switching pressure. The positive pressure is, for example, a back pressure generated when the piston base body moves in a slide-in direction from the rear space to the front space along the stroke axis. Back pressure generation occurs when the volume flow of the damping fluid displaced by the movement of the piston base body is larger than the volume flow possible through the channel.

When a speed of the movement of the piston base body exceeds a switching speed the positive pressure exceeds the switching pressure so that the valve disk is shifted into the closing position. In this way, the damping force of the fluid damper is increased, and the movement of the piston base body is braked so that an excessive speed which might lead to damage to the fluid damper or components connected thereto or to a risk of injury is prevented.

In an embodiment, the speed of the piston base body after switching into the closing position can be adjusted through the size of the minimum cross-sectional area of the channel in the closing position.

When the positive pressure in the front space is lower than the switching pressure or when there is a negative pressure in the front space relative to the rear space, in embodiments, the valve disk is in the opening position. This means that, when the piston base body moves in the slide-in direction at a speed below the switching speed or when the piston base body moves in a slide-out direction opposite to the slide-in direction, the damping force of the fluid damper is low. Therefore, components connected to each other by the fluid damper can be moved relative to each other in the slide-in direction at a speed below the switching speed as well as in the slide-out direction at any speed with low energy expenditure. In this way, for example, a flap supported by the fluid damper can be smoothly moved in normal operation, i.e., for opening the flap and for closing the flap at a speed below the switching speed.

The valve disk has a central area extending radially outward from the stroke axis, the central area being free of apertures. In this way, a large surface independent of the position of the valve disk relative to the piston base body and without apertures along the stroke axis on which a positive pressure in the front or rear space can act to achieve a large force independent of the position of the valve disk for shifting the valve disk is available in the central area. Thus, a particularly reliable and precise switching behaviour of the valve disk from the opening position to the closing position and vice versa is achieved independent of potential frictional forces on the valve disk.

In embodiments, the aperture-free central area extends outwards from the stroke axis to a central area radius, the central area radius amounting to, for example, 50% to 100%, 75% to 98%, or 85% to 95% of a valve disk radius of the valve disk radial to the stroke axis. In experiments, the indicated values of the central area radius have led to a particularly reliable switching behaviour of the valve disk.

In an embodiment, the valve disk has a number of, for example, one, two, three, four, five, or more apertures, for example ring segment-shaped apertures, for the passage of the damping fluid through the valve disk along the stroke axis outside of the central area, the apertures for example being radially open towards the outside from the stroke axis. The apertures define a throttle cross section for the damping fluid. By varying the cross-sectional area and/or the number of the apertures, the throttle cross section and thus the damping force of the fluid damper can be adjusted. The throttle cross section can be adjusted in a particularly simple and tolerance-neutral manner by varying the width of bridges between the apertures measured in the circumferential direction about the stroke axis.

The bridges between the apertures may serve to guide the valve disk on the piston base body and/or on a guide member. In an embodiment, the bridges may centre the valve disk on the stroke axis without an increased risk of skewing on the piston base body and/or on the guide member. In an embodiment, the valve disk has three apertures which are open towards the outside. In this way, three bridges for guiding the valve disk on the piston base body and/or on the guide member are obtained between the apertures.

In embodiments, the fluid damper comprises a guide member fixed to the piston base body and arranged between the valve disk and a shell wall of the cylinder, the guide member shiftably guiding the valve disk along the stroke axis between the opening position and the closing position. The guide member prevents the valve disk from contacting the cylinder which might affect the switching behaviour the valve disk.

In embodiments, the guide member is configured as a guide sleeve and/or arranged coaxially to the stroke axis. The guide member may be non-positively, positively, cohesively and/or integrally connected to the piston base body. In an embodiment, the guide member is positively and/or integrally connected to the piston base body, a simple production and a reliable connection being ensured thereby.

The fluid damper may comprise a support member for supporting the guide member on the piston base body. The support member is connected to the piston base body and to the guide member, for example, by a latch connection and/or positively.

In an embodiment, the valve disk is exclusively guided by the guide member. In this way, frictional forces acting on the valve disk are minimised so that a particularly precise switching behaviour is achieved.

In an embodiment, the fluid damper comprises at least one stopper attached to the piston base body for limiting the shiftability of the valve disk relative to the piston base body in an opening direction from the closing position to the opening position. The stopper may be integrally formed with the piston base body and/or the guide member. With the stopper, for example, a well-defined throttle cross section for the damping fluid is obtained in the opening position. In this way, the fluid damper has a well-defined damping force in normal operation when the valve disk is in the opening position.

In embodiments, the stopper comprises a number of, for example one, two, three, four, five, or more, protrusions for reducing a contact surface between the stopper and the valve disk. The protrusions are, for example, semi-spherical or conically tapered to obtain minimum, particularly point-shaped, contact surfaces between the protrusions and the valve disk. In this way, a flow surface of the valve disk for the damping fluid which is as constant as possible during a shift of the valve disk is achieved. A constant flow surface results in a precise switching operation with a low tolerance sensibility.

In embodiments, the fluid damper comprises a spring member disposed between the valve disk and the piston base body which urges the valve disk into the opening position along the stroke axis, the valve disk for example being shiftable from the opening position into the closing position against the spring member by a positive pressure in the front space relative to the rear space when the positive pressure exceeds a switching pressure. The spring member is, for example, a mechanical spring, particularly a helical compression spring.

In an embodiment, the spring member ensures that the valve disk is in the opening position when there is no positive pressure exceeding the switching pressure in the front space. In this way, the fluid damper has a low damping force at any time in normal operation when the piston base body moves in the slide-in direction or in the slide-out direction at a speed below the switching speed.

In an embodiment, the spring member is arranged in a recess of the piston base body, for example in a bore in the piston base body which is coaxial to the stroke axis. The arrangement in a recess prevents the spring member from contacting the cylinder which might affect the switching behaviour of the valve disk.

In an embodiment, the recess in which the spring member is arranged has a smaller diameter than the valve disk transverse to the stroke axis so that an edge of the recess forms a well-defined valve seat for the valve disk in the closing position.

The recess in which the spring member is arranged may form a section of the channel. From the recess, another section of the channel may extend through the piston base body, for example, axially or radially to the stroke axis.

The fluid damper is characterised by very precisely adaptable switching properties, for example a precisely adaptable switching speed, and by decoupling the switching properties from influences of friction since the valve disk must be moved exclusively against the spring force of the spring member.

The valve disk may be deformable, particularly elastically deformable, in the closing position by a positive pressure in the front space relative to the rear space so that the valve disk unblocks the at least one channel when the positive pressure exceeds an override pressure. In this way, damage to the fluid damper, particularly the valve disk, by an excessive positive pressure, for example due to an incorrect operation of the fluid damper, is prevented. Alternatively, protection from an excessive positive pressure may, for example, be provided by predefined leakages, particularly on a sealing surface between the valve disk and the piston base body, and/or by connecting an additional bypass for the damping fluid from the front to the rear space.

In an embodiment, the valve disk is rigid, and for example, not provided with a central aperture, a central bore, or a central bypass. In this way, a particularly reliable and well predictable switching behaviour of the valve disk is obtained.

In embodiments, the valve disk comprises a plastic material or is made of a plastic material. In embodiments, the valve disk is obtainable by injection moulding. A particularly light-weight valve disk, also in a shape deviating from a simple circular disk, can be produced at low cost from a plastic material, particularly by injection moulding. A low mass of the valve disk is advantageous in that it can be shifted with little effort which results in a precise switching behaviour.

In embodiments, the fluid damper comprises a seal member arranged between the valve disk and the piston base body, for example a seal ring, particularly an O-ring sealing the valve disk from the piston base body in a fluid-tight manner in the closing position.

In an embodiment with simple production no separate seal member is arranged between the valve disk and the piston base body, but the valve disk directly abuts on the piston base body in the closing position. A sufficient sealing effect can be achieved, for example, by an appropriate material of the valve disk, particularly a softer material as compared to the piston base body, for example a plastic material, and/or by a coating of the valve disk and/or of the piston base body.

In embodiments, a contact surface between the valve disk and the piston base body is ring-shaped to obtain a switching piston having a particularly simple design and a well predictable switching behaviour.

In embodiments, the fluid damper comprises a piston rod attached to the piston base body, the piston rod for example being fixed to the piston base body by shaping. For example, in embodiments, the piston base body encloses the piston rod in sections radial to the stroke axis and is fixed to the piston rod by shaping towards the stroke axis, particularly in a groove of the piston rod. Shaping towards the stroke axis is advantageous in that, as compared to other fastening methods, for example as compared to a rivet connection of the piston base body to the piston rod along the stroke axis, no forces act on the valve disk here so that the switching function of the valve disk cannot be affected.

The piston base body may be fixed to the piston rod by a rivet connection, a complexity of the rivet connection for example being reduced by a direct one-piece riveting of the piston base body to the piston rod.

In embodiments, a connection of the piston base body to the piston rod is outside of a movement range of the valve disk so that the switching function of the valve disk is not affected by the connection.

In embodiments, the piston rod and/or the piston base body is made of aluminium and/or of steel.

In embodiments, the fluid damper comprises at least one connecting member, for example a spherical socket, on the cylinder and on the piston rod, respectively, to mechanically connect the fluid damper to other components, for example to a flap and a chassis of a vehicle.

In embodiments, the fluid damper comprises a seal attached to the piston base body, for example, encircling the stroke axis, for example a seal ring, particularly an O-ring, sealing the piston base body to the shell wall of the cylinder in a fluid-tight manner. In an embodiment, the seal ensures that the damping fluid cannot flow between the piston base and the shell wall from the front into the rear space or vice versa. Therefore, the damping behaviour of the fluid damper is exclusively determined by the flow resistance of the damping fluid in the channel.

In embodiments, the method for manufacturing the fluid damper comprises at least shaping of the piston base body of the fluid damper onto the stroke axis of the fluid damper for fixing the piston base body to the piston rod of the fluid damper. This results in the abovementioned advantages of shaping.

In embodiments, the method comprises injection moulding or a fine punching method of the valve disk of the fluid damper. With this method, for example, a shape of the valve disk deviating from a simple circular disk, for example by apertures and/or protrusions, can be economically manufactured.

Embodiments of the invention relate to a drive arrangement for a flap of a motor vehicle including at least one motorised drive for moving the flap and at least one fluid damper according to embodiments of the invention for supporting the flap. The fluid damper is configured as a gas pressure spring, wherein the gas pressure spring may be integrated in a suspension strut.

In an embodiment, the fluid damper is configured so that the valve disk is in the opening position in the normal operation of the drive arrangement so that the fluid damper has a low damping force and can move the motorised drive of the flap at low energy consumption.

In an embodiment, the fluid damper is configured so that the valve disk is shifted from the opening position into the closing position in case of emergency, for example in case of an uncoupling or loss of power of the motorised drive so that the damping force of the fluid damper is increased and that the flap is lowered in a controlledly braked manner.

BRIEF DESCRIPTION

Some of the embodiments will be described in detail, with references to the following Figures, wherein like designations denote like members, wherein.

DETAILED DESCRIPTION

Figure 1:
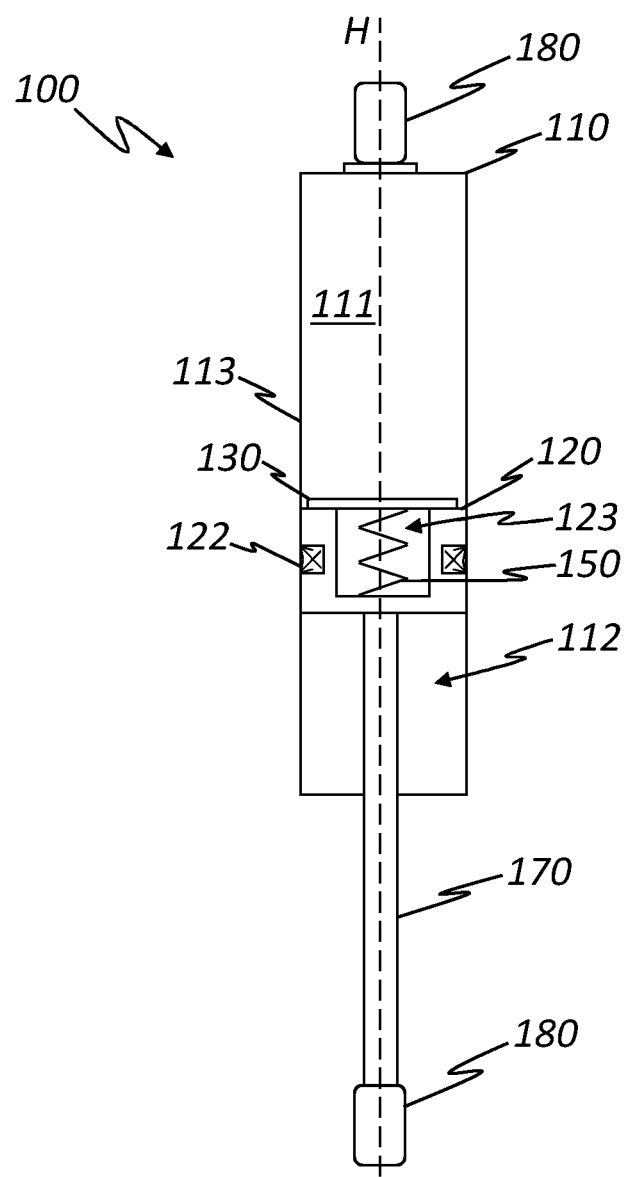
FIG. 1 shows a schematic longitudinal cross-sectional view along the stroke axis of an embodiment of the fluid damper.

FIG. 1 shows a schematic longitudinal cross-sectional view along a stroke axis H of an embodiment of a fluid damper 100.

The fluid damper 100 comprises a cylinder 110 filled with a damping fluid (not illustrated), for example with a gas having a positive pressure, a piston base body 120 shiftably guided in the cylinder 110 along the stroke axis H, and a valve disk 130 spaced apart from of a shell wall 113 of the cylinder 110.

The piston base body 120 divides an inner space of the cylinder 110 into a front space 111 and a rear space 112 along the stroke axis H, at least one channel (not illustrated) connecting the front space 111 to the rear space 112 in a fluid-conducting manner being disposed in the piston base body 120.

The fluid damper 100 comprises a seal 122 attached to the piston base body 120 and encircling the stroke axis H which seals the piston base body 120 with respect to the shell wall 113 of the cylinder 110 in a fluid-tight manner.

The valve disk 130 is shiftably guided relative to the piston base body 120 along the stroke axis H between an opening position unblocking the at least one channel 121 and a closing position closing the at least one channel 121.

The fluid damper 100 comprises a spring member 150, for example a helical compression spring, arranged between the valve disk 130 and the piston base body 120. The spring member 150 urges the valve disk 130 into the opening position along the stroke axis H, the valve disk 130 being shiftable from the opening position into the closing position against the spring member 150 by a positive pressure in the front space 111 relative to the rear space 112 when the positive pressure exceeds a switching pressure.

The spring member 150 is arranged in a recess 123 in the piston base body 120, for example in a bore coaxial to the stroke axis H.

The fluid damper 100 comprises a piston rod 170 fixed to the piston base body 120 which is lead out of the cylinder 110 through the rear space 112.

On the end of the piston rod 170 not attached to the piston base body 120 as well as on the end of the cylinder 110 on which the piston rod 170 is not lead out of the cylinder 110, respectively, a connecting member 180, for example a spherical socket, is arranged to mechanically connect the fluid damper 100 to other components, for example to a flap and a chassis of a vehicle.

Figure 2:
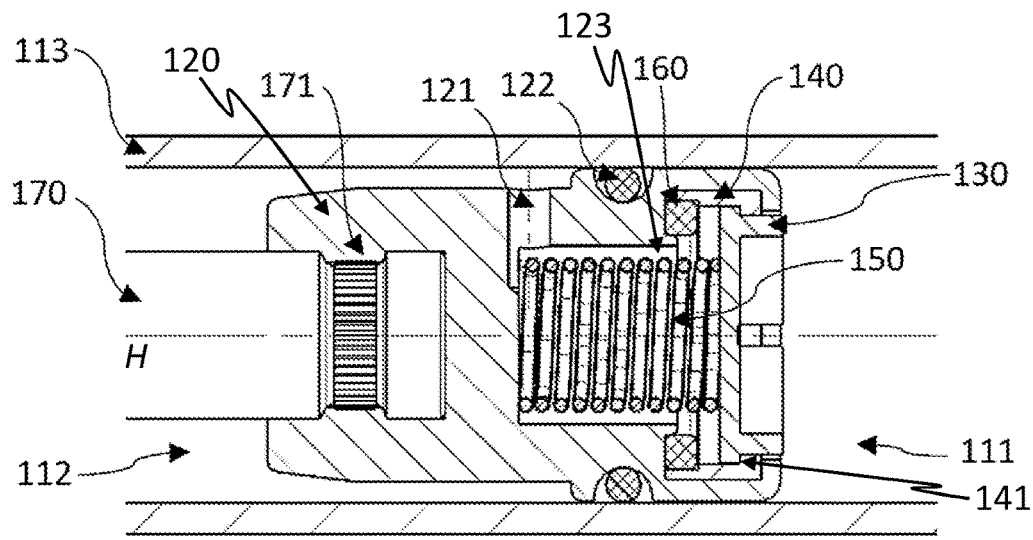
FIG. 2 shows a schematic longitudinal cross-sectional view along the stroke axis of an embodiment of the switching piston of the fluid damper in the opening position.

FIG. 2 shows a schematic longitudinal cross-sectional view along the stroke axis of an embodiment of the switching piston of the fluid damper 100 in the opening position. Components already shown in FIG. 1 are designated by the same reference numerals as in FIG. 1 and not described again.

In FIG. 2, the channel 121 in the piston base body 120 connecting the front space 111 to the rear space 112 in a fluid-conducting manner is illustrated. The channel 121 comprises, for example, a bore radial to the stroke axis H which connects the recess 123 in which the spring member 150 is arranged to the rear space 112 in a fluid-conducting manner.

The fluid damper 100 shown in FIG. 2 comprises a guide member 140 fixed to the piston base body 120 and disposed between the valve disk 130 and a shell wall 113 of the cylinder 110, for example a guide sleeve coaxial to the stroke axis H. The guide member 140 shiftably guides the valve disk 130 along the stroke axis H between the opening position shown in FIG. 2 and the closing position.

The guide member 140 comprises a stopper 141, for example a protrusion encircling the stroke axis H and oriented towards the stroke axis H for limiting the shiftability of the valve disk 130 relative to the piston base body 120 in an opening direction from the closing position to the opening position.

In the embodiment shown in FIG. 2, the piston base body 120 sectionally encloses the piston rod 170 radial to the stroke axis H. The piston base body 120 is fixed in a groove 171 of the piston rod 170 on the piston rod 170 by shaping towards the stroke axis H.

Figure 3:
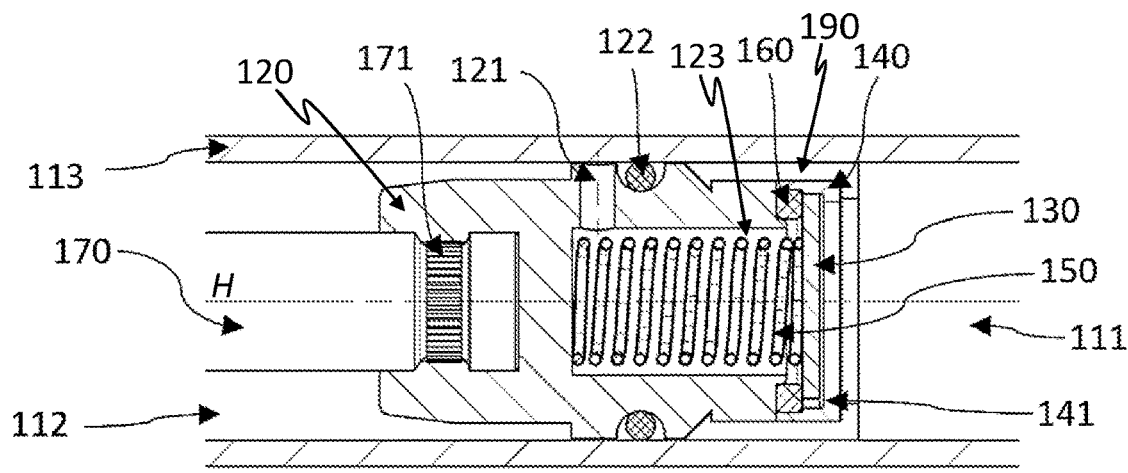
FIG. 3 shows a schematic longitudinal cross-sectional view along the stroke axis of another embodiment of the switching piston of the fluid damper in the closing position.

FIG. 3 shows a schematic longitudinal cross-sectional view of another embodiment of the switching piston of the fluid damper 100 in the closing position along the stroke axis H. The components already illustrated in FIG. 1 or 2 are designated by the same reference numerals provided there and will not be described again.

The fluid damper 100 shown in FIG. 3 comprises a support member 190 for supporting the guide member 140 on the piston base body 120. The support member 190 is, for example, connected to the piston base body 120 via a latch connection, and positively connected to the guide member 140.

Figure 4:
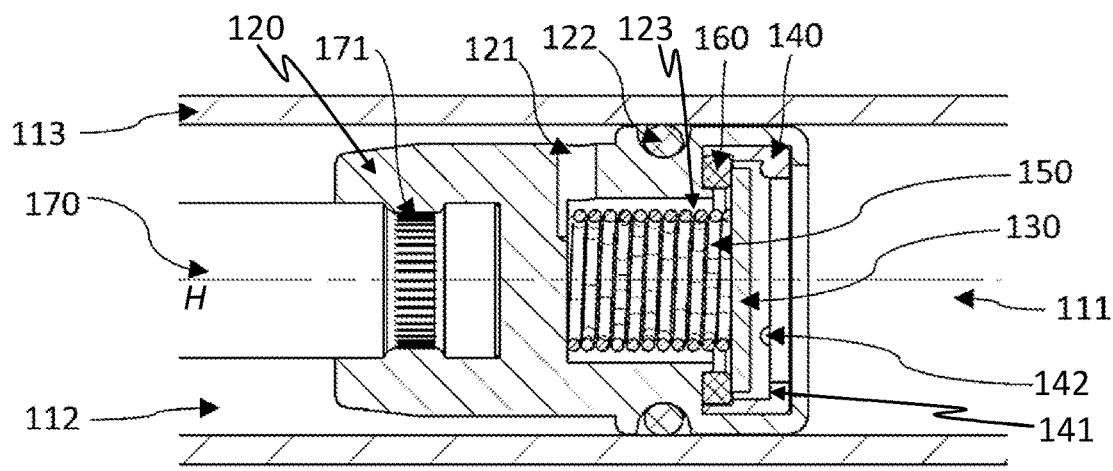
FIG. 4 shows a schematic longitudinal cross-sectional view along the stroke axis of another embodiment of the switching piston of the fluid damper in the closing position.

FIG. 4 shows a schematic longitudinal cross-sectional view of another embodiment of the switching piston of the fluid damper 100 in the closing position along the stroke axis. The components already illustrated in FIG. 1, 2, or 3 are designated by the same reference numerals as provided there and will not be described again.

In the embodiment shown in FIG. 4, the stopper 141 for the valve disk 130 comprises a number of, for example three, protrusions 142 for reducing a contact surface between the stopper 141 and the valve disk 130. The protrusions 142 are, for example, semi-spherical.

Figure 5:
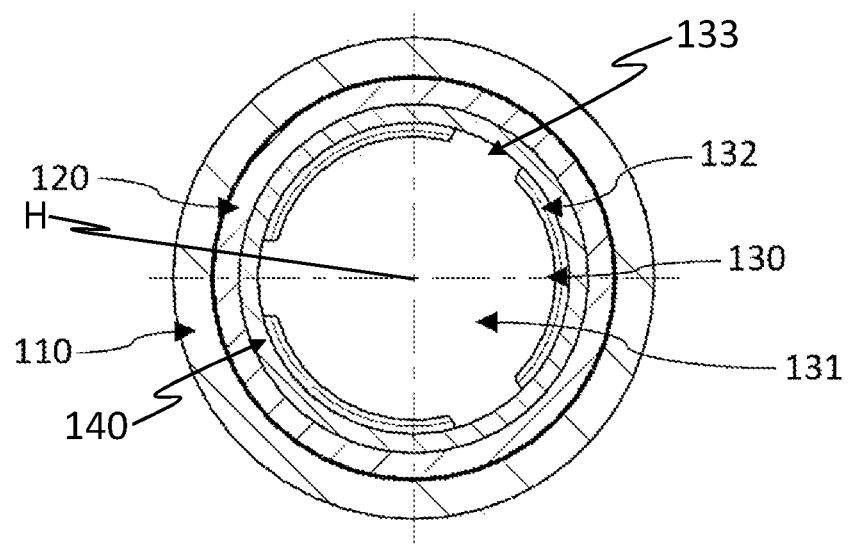
FIG. 5 shows a schematic plan view along the stroke axis of another embodiment of the switching piston of the fluid damper.

FIG. 5 shows a schematic plan view of another embodiment of the switching piston of the fluid damper 100 along the stroke axis H. The components already illustrated in FIG. 1, 2, 3, or 4 are designated by the same reference numerals as provided there and will not be described again.

In FIG. 5, the valve disk 130 has a central area 131 extending radially outward from the stroke axis H, the central area 131 being formed free of apertures, i.e., without apertures along the stroke axis H.

Outside of the central area 131, the valve disk 130 shown in FIG. 5 has a number of, for example three, apertures 132 for the passage of the damping fluid through the valve disk 130 along the stroke axis H. The apertures 132 are, for example, ring segment-shaped and radially open towards the outside from the stroke axis H.

Between adjacent apertures 132, a bridge 133 is arranged, respectively, which may serve for guiding the valve disk 130 on the guide member 140.

| List of reference numerals | |
| --- | --- |
| 100 | Fluid damper |
| 110 | Cylinder |
| 111 | Front space |
| 112 | Rear space |
| 113 | Shell wall |
| 120 | Piston base body |
| 121 | Channel |
| 122 | Seal |
| 123 | Recess |
| 130 | Valve disk |
| 131 | Central area |
| 132 | Aperture |
| 133 | Bridge |
| 140 | Guide member |
| 141 | Stopper |
| 142 | Protrusion |
| 150 | Spring member |
| 160 | Seal member |
| 170 | Piston rod |
| 171 | Groove |
| 180 | Connecting member |
| 190 | Support member |
| H | Stroke axis |

The invention claimed is:

1. A fluid damper, comprising:
   a. a cylinder filled with a damping fluid;
   b. a piston base body shiftably guided in the cylinder along a stroke axis; and
   c. a valve disk spaced apart from a shell wall of the cylinder;
   d. the piston base body dividing an inner space of the cylinder into a front space and a rear space along the stroke axis;
   e. at least one channel connecting the front space to the rear space in a fluid-conducting manner being arranged in the piston base body;
   f. the valve disk being shiftably guided relative to the piston base body along the stroke axis between an opening position unblocking the at least one channel and a closing position closing the at least one channel;
   g. the valve disk having a central area extending radially outward from the stroke axis, the central area being free of apertures;
   wherein
   h. the fluid damper comprises a stopper attached to the piston base body for limiting the shiftability of the valve disk relative to the piston base body in an opening direction from the closing position to the opening position; and
   i. the stopper comprises a number of semi-spherical or conically tapered protrusions for reducing a contact surface between the stopper and the valve disk;
   j. the valve disk has a number of apertures for the passage of the damping fluid through the valve disk along the stroke axis outside of the central area; and
   k. the number of apertures are ring segment-shaped and/or radially open towards the outside from the stroke axis.

2. The fluid damper according to claim 1, wherein the aperture-free central area extends outwards from the stroke axis up to a central area radius, the central area radius amounting to 50% to 100% of a valve disk radius of the valve disk radial to the stroke axis.

3. The fluid damper according to claim 1, wherein a guide member is fixed to the piston base body and arranged between the valve disk and the shell wall of the cylinder, the guide member shiftably guiding the valve disk along the stroke axis between the opening position and the closing position.

4. The fluid damper according to claim 1, wherein the fluid damper comprises a spring member arranged between the valve disk and the piston base body which urges the valve disk into the opening position along the stroke axis, the valve disk being shiftable from the opening position into the closing position against the spring member by a positive pressure in the front space relative to the rear space when the positive pressure exceeds a switching pressure.

5. The fluid damper according to claim 4, wherein the spring member is arranged in a recess in the piston base body.

6. The fluid damper according to claim 5, wherein the recess has a smaller diameter than the valve disk transverse to the stroke axis.

7. The fluid damper according to claim 1, wherein the valve disk is elastically deformable in the closing position by a positive pressure in the front space relative to the rear space so that the valve disk unblocks the at least one channel when the positive pressure exceeds an override pressure.

8. The fluid damper according to claim 1, wherein
the valve disk directly abuts on the piston base body in the closing position, a contact surface between the valve disk and the piston base body being ring-shaped.

9. The fluid damper according to claim 1, wherein
the fluid damper comprises a piston rod fixed to the piston base body, the piston base body sectionally enclosing the piston rod radial to the stroke axis and being fixed to the piston rod by shaping the piston base body towards the stroke axis.

10. A method for manufacturing the fluid damper according to claim 9, comprising:
shaping of the piston base body of the fluid damper towards the stroke axis of the fluid damper for fixing the piston base body to the piston rod of the fluid damper.

11. A fluid damper, comprising:
a cylinder filled with a damping fluid;
a piston base body shiftably guided in the cylinder along a stroke axis; and
a valve disk spaced apart from a shell wall of the cylinder;
the piston base body dividing an inner space of the cylinder into a front space and a rear space along the stroke axis;
at least one channel connecting the front space to the rear space in a fluid-conducting manner being arranged in the piston base body;
the valve disk being shiftably guided relative to the piston base body along the stroke axis between an opening position unblocking the at least one channel and a closing position closing the at least one channel;
the valve disk having a central area extending radially outward from the stroke axis, the central area being free of apertures;
wherein the fluid damper comprises a stopper attached to the piston base body for limiting the shiftability of the valve disk relative to the piston base body in an opening direction from the closing position to the opening position;
the stopper comprises a number of semi-spherical or conically tapered protrusions for reducing a contact surface between the stopper and the valve disk; and
the valve disk is elastically deformable in the closing position by a positive pressure in the front space relative to the rear space so that the valve disk unblocks the at least one channel when the positive pressure exceeds an override pressure.

* * * * *